2,857,392
PREPARATION OF AZOLES
Fred Applegath and Raymond A. Franz, El Dorado, Ark., assignors to Monsanto Chemical Company, St. Louis, Mo., a corporation of Delaware No Drawing. Application December 24, 1956
Serial No. 630,058

8 Claims. (Cl. 260—304)

The present invention relates to a new process for the production of azoles.

It is known that 1,4-dienol compounds will undergo ring closure under certain conditions to form azoles. Also it is known that alpha substituted ketones and aldehydes can be condensed with thioamides, thiourea, amides, thiocyanates, cyanates and the like to produce the corresponding azoles. The 2-oxazolidones may be prepared by reacting a beta-amino alcohol with an alkyl carbonate. All of these processes require costly reactants, or multistage reactions or both.

It is the principal object of the present invention to provide a new and economical process for the production of azoles. It is a further object to provide a new process particularly applicable to the production of 2-oxazolidones. A still further object is to prepare azoles directly in a one-step reaction utilizing inexpensive reactants. Other objects and advantages of the invention will be apparent from the description which follows.

According to the present invention, azoles are prepared directly in a simple manner with good yields and product purity by reacting carbon monoxide and sulfur with a compound selected from the group consisting of 2-hydroxy substituted mono-primary-amines and 2-thiol substituted mono-primary-amines. The following examples illustrate the invention.

Example I

A 1.8 liter stainless steel bomb, having a working pressure of 400 p. s. i. and provided with a heating element, was used as a reactor. The bomb was charged with 15.3 grams ethanolamine, 8.0 grams sulfur, and 400 ml. methanol as solvent. Carbon monoxide was charged to the reactor under an initial pressure of 80 p. s. i. a. (room temperature). The closed bomb was heated at about 100° C. for two hours with agitation. The reactor was then emptied and the contents filtered hot. The filtrate was evaporated to a small volume to crystallize out nearly pure 2-oxazolidone in 90% yield. Without further purification, the product melted at 80° C.; further purification by way of recrystallization gave a product melting at 88° C.–90° C. Analysis of the compound gave 16.02% N, compared to the theoretical calculated for $C_3H_5O_2N$ of 16.1%.

Example II

A 1.8 liter stainless steel bomb, provided with a heating element was used as the reactor. The bomb was charged with 38.0 g. tris-(hydroxymethyl)-aminomethane (0.314 mole), 5.0 g. of sulfur (0.156 mole) and 200 ml. of methyl alcohol as a solvent. Carbon monoxide was introduced to the bomb until the gauge pressure registered 70 p. s. i. The bomb was heated to a temperature of 100° C. for a period of two hours. The reactor was then emptied and the unreacted amine permitted to crystallize out of the methanol reaction solution. The mother liquor was then evaporated and recrystallized several times from isopropanol to give a solid, which was identified as the compound 4,4-bis(hydroxymethyl)-2-oxazolidone (M. P. 106–110° C.).

Example III

The compound 4-ethyl-2-oxazolidone was prepared similarly to Example II by reacting 20.0 g. of 2-amino-butanol (0.224 mole), 2.58 g. sulfur (0.08 mole) under a carbon monoxide initial pressure of 70 p. s. i. g. in the presence of 50 ml. of methanol as a solvent. The reaction was carried out for 2 hours at 120° C.

Example IV

A one gallon autoclave provided with a heating element was employed as a reactor. Isopropanolamine was charged to the reactor in an amount comprising 382.0 g. (5.1 moles) 163.0 g. of sulfur (5.1 moles) and 3,785 cc. of methanol as solvent were added. The reactor was closed and charged with 300 p. s. i. g. carbon monoxide (room temperature initial pressure) and heated for two hours at a temperature of 120° C. The reactor was then vented to remove by-product $H_2S$ and opened. The reaction mixture was distilled to separate the product, 5-methyl-2-oxazolidone from the methanol and unreached amine. An 88.0% yield, based on theoretical, was obtained: B. P. 145–147°/5–6 mm.

Analysis.—Percent calculated for $C_4H_7NO_2$: N, 13.87. Found: N, 13.69.

Example V

A 1-liter stainless steel autoclave was charged with 25.0 g. of o-aminobenzenethiol (0.20 mole), 12.8 g. of sulfur (0.40 mole), 50 ml. of pyridine as a solvent, and 2.0 g. of triethylamine base (0.02 mole). Carbon monoxide was then charged to the autoclave under an initial pressure of 200 p. s. i. g. The vessel was then heated for 3½ hours at a temperature of 115° C. after which the autoclave was vented, opened and rinsed with ethanol. A solution was evaporated to near dryness and the product filtered out in a Büchner funnel and washed with cold benzene. A yield of 93% of the compound 2-hydroxy-benzthiazole was obtained as a light brown crystalline solid (M. P. 132°–134° C.). On recrystallization, the product had a melting point of 136° C.

Example VI

Using the same equipment and conditions set forth in the preceding example, a 77.0% yield of the compound 2-benzoxazolol was obtained by mixing together 25.0 g. of o-aminophenol (0.229 mole), 14.6 g. of sulfur (0.458 mole) and 200 p. s. i. g. initial carbon monoxide pressure in the presence of 2.3 g. triethylamine base and 50 ml. pyridine as solvent. At the end of the 3½ hours reaction period (115° C.) the autoclave was vented to remove $H_2S$, opened and rinsed with methanol. The solution was then evaporated to dryness and the residue treated with hot benzene. The insoluble material was dissolved in NaOH and reprecipitated with HCl. The product had a M. P. of 123° C. before recrystallizing from isopropanol. The M. P. was 130° C. after recrystallization.

Example VII

The procedure set forth in Example V is repeated using in place of o-aminobenzenethiol, 0.20 mole of β-thiol-α-naphthyl-amine. 2-hydroxy-β-naphthathiazole is obtained.

Example VIII

The procedure set forth in Example V is repeated using in place of o-aminobenzenethiol, 0.20 mole α-thiol-β-naphthylamine. 2-hydroxy-α-naphthathiozole is obtained.

Example IX

The procedure set forth in Example V is repeated using in place of o-aminobenzenethiol, 0.20 mole of β-hydroxy-α-naphthylamine. 2-hydroxy-β-naphthoxazole is obtained.

Example X

The procedure set forth in Example V is repeated using in place of o-aminobenzenethiol, 0.20 mole of α-hydroxy-β-naphthylamine. 2-hydroxy-α-naphthoxazole is obtained.

In carrying out the novel process of this invention, the 2-hydroxy substituted or 2-thiol substituted mono-primary-amine can be aliphatic or aromatic. By "mono-primary-amine" is meant an organic compound containing not more than one —NH₂ group. These amines may be further substituted with one or more substituent groups which are inert under the conditions of the reaction, i. e., do not prevent the formation of any of the desired azole. Typical of substituent groups that can additionally be present are alkyl, alkoxy, aralkyl, alkaryl, halogen, dialkylamino, hydroxy, thiol, cyano, cyanoethyl, nitro, etc. In the aromatic series, 2-aminophenols, 2-aminobenzenethiols, and naphthylamines containing the SH or OH group on the carbon atom adjacent to the carbon atom to which the NH₂ group is attached are preferred. Preferred aliphatic amines are those represented by the formula

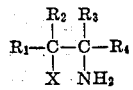

wherein $R_1$, $R_2$, $R_3$ and $R_4$ are selected from the group consisting of hydrogen, alkyl and hydroxyalkyl radicals and X is selected from the group consisting of SH and OH.

The proportion of the reactants used in the process of this invention can be varied substantially. The stoichiometry of the reaction indicates the mole ratio of amine to carbon monoxide to sulfur to be 1:1:1. It has been found that any of the reactants can be used in excess if desired with the quantity being dictated more by economics than by the reaction itself. From about 0.5 to about 4 molecular proportions of the amine for each molecular proportion of sulfur have been found to be satisfactory. Carbon monoxide is generally employed in excess with the quantity being determined primarily by the reaction pressure desired.

The temperature of the reaction can also be varied substantially. Temperatures as low as about 70° C. and as high as 200° C. are operable. Preferably the temperature is maintained from about 90° C. to about 150° C.

The reaction can be carried out over a wide range of reaction pressures. While the reaction will proceed at atmospheric pressure, super-atmospheric pressures are generally preferred. Pressures in the range of from about 25 p. s. i. a. to about 500 p. s. i. a. or even higher can be employed.

It is desirable to carry out the process in the presence of an inert solvent or diluent. For this purpose alkyl alcohols containing from 1 to 8 carbon atoms are preferred. Other diluents which can be employed in this reaction are hydrocarbons, halogenated hydrocarbons, mineral oils, ethers, amines, glycols and acid amides. Water per se is not a preferred diluent although it can be present in minor amounts in the organic diluent. The following are examples of materials that can be employed as diluents: ligroin, isopropanol, isopropyl ether, ethanol, trichloroethylene, pyridine, isopropanol-water, ethylene glycol, methyl Cellosolve, tetrahydrofurfuryl alcohol, N,N-dimethylaniline, N,N-diethyl-ethanolamine, formamide, amyl alcohol, and benzene.

When aromatic amines are used as the reactant, it is preferred that the reaction be carried out in the presence of an additional alkaline material. Any alkaline material having a dissociation constant greater than about $1 \times 10^{-10}$ can be used as the alkaline catalyst in this reaction. For this purpose tertiary alkyl amines containing from 1 to 18 carbon atoms are particularly preferred. Other catalysts that can be used are quaternary ammonium hydroxides, alkaline earth metal hydroxides, the alkali metal hydroxides, of which sodium hydroxide and potassium hydroxide are particular examples, alkaline alkali metal salts, such as sodium oleate, N,N-dimethylbenzylamine, N,N-diethyl-p-toluidine, tri-n-hexylamine, triethanolamine, N,N-diethyloctadecylamine, a mixture of magnesium oxide and methanol and a mixture of calcium and methanol. The quantity of alkaline material used for the catalyst can also be varied substantially. Minor amounts are preferred. From about 0.002 to about 0.2 mole of the alkaline catalyst per mole of the aromatic amine have been found to be particularly useful.

The compounds to which the process of the present invention relate are useful organic intermediates in the preparation of physiologically active compounds. The 2-oxazolidones are themselves physiologically active having analgesic, antipyretic, antibiotic and anticonvulsant properties. Furthemore, certain of the 2-oxazolidones find application as plasticizers for nitrocellulose.

If desired, the sulfur value from the by-product hydrogen sulfide formed in our process may be recovered by well-known methods, e. g. by partial oxidation.

This application is a continuation-in-part of copending application Serial Number 593,040 filed June 22, 1955, now abandoned.

What is claimed is:

1. A process for preparing azoles which comprises reacting carbon monoxide and sulfur with a compound selected from the group consisting of 2-hydroxy substituted mono-primary-amines and 2-thiol substituted mono-primary-amines at an elevated temperature above about 70°C.

2. A process as described in claim 1 wherein the reaction is carried out at a temperature in the range of from about 90°C. to about 150°C. and at a pressure above atmospheric.

3. A process as described in claim 2 wherein the reaction is carried out in the presence of an inert diluent.

4. A process for preparing azoles which comprises reacting a β-amino-alcohol, sulfur and carbon monoxide in an inert diluent at a temperature in the range of from about 90°C. to about 150°C. and at a pressure above atmospheric.

5. A process for preparing 2-benzoxazolol which comprises reacting 2-aminophenol with carbon monoxide and sulfur in an inert diluent, at a temperature in the range of from about 90°C. to about 150°C., at a pressure above atmospheric and in the presence of an alkaline catalyst having a dissociation constant greater than $1 \times 10^{-10}$.

6. A process for preparing 2-hydroxybenzthiazole which comprises reacting 2-aminobenzenethiol with carbon monoxide and sulfur in an inert diluent, at a temperature in the range of from about 90°C. to about 150°C., at a pressure above atmospheric and in the presence of an alkaline catalyst having a dissociation constant greater than $1 \times 10^{-10}$.

7. A process for preparing 4,4-bis(hydroxymethyl)-2-oxazolidone which comprises reacting tris(hydroxymethyl)-aminomethane with carbon monoxide and sulfur at a temperature in the range of from about 90°C. to about 150°C., in an inert diluent and under a pressure above atmospheric.

8. A process for preparing 4-ethyl-2-oxazolidone which comprises reacting 2-aminobutanol with carbon monoxide and sulfur at a temperature in the range of from about 90°C. to about 150°C., in an inert diluent and under a pressure above atmospheric.

References Cited in the file of this patent

Hoffman; Ber. Deut. Chem., vol. 12, pages 2359–2365 (1879).

Hoffman: Ber. Deut. Chem., vol. 13, pp. 123–25 (1880).

Hoffman: Ber. Deut. Chem., vol. 20, pages 1798–1805 (1897).

Hunter: J. Chem. Soc., vol. 1930, pages 125–128.

UNITED STATES PATENT OFFICE
CERTIFICATE OF CORRECTION

Patent No. 2,857,392                                October 21, 1958

Fred Applegath et al.

It is hereby certified that error appears in the printed specification of the above numbered patent requiring correction and that the said Letters Patent should read as corrected below.

Column 4, line 23, for "filed June 22, 1955" read -- filed June 22, 1956 --.

Signed and sealed this 20th day of September 1960.

(SEAL)
Attest:
KARL H. AXLINE
Attesting Officer

ROBERT C. WATSON
Commissioner of Patents